United States Patent Office 3,845,180
Patented Oct. 29, 1974

3,845,180
PREPARATION OF PEARLESCENT PLASTICS
Jules Pinsky, Scarborough, N.Y., assignor to The Mearl Corporation, Ossining, N.Y.
No Drawing. Filed Apr. 24, 1972, Ser. No. 246,923
Int. Cl. B29d 7/24, 27/00; B29h 7/20
U.S. Cl. 264—41                  8 Claims

ABSTRACT OF THE DISCLOSURE

Pearlescence and increased opacity is imparted to or improved in plastics, which neck down on cold drawing and which have crystallinity and/or contain a platy substance, by cold stretching.

BACKGROUND OF THE INVENTION

Uni-axial and bi-axial orientation of plastic products is a common phenomenon. Such orientation improves the physical properties of the plastics such as flexibility, Elmendorf tear strength, elongation, tensile strength, Mullen burst strength, impact strength, and cold strength properties. The desired orientation is accomplished by subjecting the plastic to longitudinal and/or transverse tensile stress at a temperature somewhat above the second order transition temperature or the glass transition temperature thereof.

Johnson in U.S. Pat. 3,154,461 and McKee et al. in U.S. Pat. 3,408,226 teach that dispersing a finely divided particulate material in a plastic and thereafter bi-axially stretching or orientating the body at a temperature somewhat above the second order transition temperature of the polymer causes a roughening of the surface and produces a matte finish instead of producing the expected glossy finish. A subsequent uni-axial or bi-axial stretching or orientating transforms the colorless transparent body to a white opaque body and the matte finish is retained. In McKee et al., a simulated satin appearance is obtained by adhering a thin, substantially opaque, metallic layer on the film surface opposite the grainy surface.

I have now found a method in which pearlescent luster and increased opacity can be introduced into nonpearly plastics. In plastic articles which already have a pearlescent luster, such as those containing a nacreous pigment, my method enhances the pearlescence thereof. In both instances, the glossy surfaces of the plastic is retained.

It is therefore the object of this invention to provide a simple method of imparting or improving pearlescense and/or opacity in a plastic article. This and other objects of this invention will become apparent to those skilled in the art from the following detailed description.

SUMMARY OF THE INVENTION

This invention relates to a method of producing pearlescence and increased opacity in plastic articles. More particularly, this invention relates to a method of imparting or improving pearlescence and/or opacity in a plastic article by cold stretching the polymers. The invention also relates to the resulting pearlescent articles.

DESCRIPTION OF THE PREFERRED EMBODIMENTS

In accordance with the present invention, pearlescence is imparted to plastics by cold stretching or cold drawing. The polymeric materials used in the present invention have three characteristics. The plastic must, of course, be capable of being cold drawn. It must also "neck down" when it is cold drawn. Finally, the polymeric material must contain an internal structure that produces vacuum voids on such drawing or be a suitable matrix for a platy material so as to form voids around such platelets. In other words, the polymeric material must have sufficient crystallinity to produce vacuum voids upon cold drawing or be a suitable binder for platelets.

The platy material is constituted of plate-like particles having substantially smooth surfaces and major dimensions of from about 3 to 100 microns, preferably 5 to 50 microns, and a thickness of about 10 to 1000 millimicrons. Such platelets readily orient along flow planes and assume positions parallel to one another when they are incorporated in a thermoplastic material by extrusion, injection molding and the like. The platelets need not be of a nacreous pigment. In other words, patelets of materials of relatively low refractive index, such as mica, can be used. No reflection takes place at the exposed mica surface because the refractive index of mica (about 1.58) is close to the refractive index of most plastic media (about 1.50–1.59).

The platelets can also be those of high refractive index such as are used in nacreous pigments. In such case, each platelet will reflect part and transmit part of the incident light. When the plastic medium is sufficiently transparent, incident light is simultaneously reflected from the platelets at different depths giving an appearance of a pearly luster. Titanium dioxide-coated mica platelets are among the most popular and useful of the nacreous pigments. See, for example, U.S. Pat. No. 3,087,828. The pigment particle is essentially a three-layer sandwich structure having a mica center between two layers of $TiO_2$. The particle derives its plate-like shape from the mica and its high refractive index from the titanium dioxide layers. Optically, the particle behaves like two platelets of titanium dioxide, inasmuch as the mica makes a negligible contribution to the reflection from the particle. Other nacreous pigments, such as natural pearl essence, basic lead carbonate, bismuth oxychloride, and the like, can also be used.

The color imparted by the platelets depends on the optical thickness, i.e., the product of the geometric thickness and refractive index. For example, when the optical thickness of $TiO_2$ coated mica is in the range of 80–150 nanometers (nm.), the reflection is essentially white and the pigment is a white pearl pigment. A $TiO_2$ layer with an optical thickness of about 200 nm. has a yellow reflection and the color of the pigment is yellow or gold. Higher optical thicknesses produce other reflection colors, e.g., about 250 nm.—magenta or red reflection; about 310 nm.—blue reflection; about 360 nm.—green reflection.

In general, when the platy material is used in conjunction with the plastic, about 0.025 to 9 percent of the total weight of the plastic and platelet will be contributed by the platy material.

The plastics employed in the present invention are the clear or translucent thermoplastic resins. Such resins can be prepared by polymerizing ethylenically unsaturated monomers. Typical materials include the homopolymers and copolymers of unsaturated aliphatic, cycloaliphatic and aromatic hydrocarbons of 2 to about 10 carbon atoms per molecule. For example, suitable monomers include ethylene, propylene, butene, pentene, octene, 2-methyl propene-1, butadiene, isoprene, styrene, methylstyrene and the like. Block copolymers and graft copolymers, such as the graft copolymer of a polybutadiene with styrene and acrylonitrile, are also suitable. Other suitable plastics include vinyl polymers and copolymers such as polyvinyl acetate, polyvinyl chloride and polyvinylidene chloride. Acrylic acid and its derivatives such as methylacrylate, ethylacrylate, methacrylic acid, methyl methacrylate, ethyl methacrylate, acrylamide, methacrylamide, and the like are also suitable monomers. Other resins which can be employed include polycarbonate, acrylonitrile, methacrylonitrile, and styreneacrylonitrile copolymer.

The plastic can be in the form of a film, sheet, ribbon, fiber, monofilament, rod, tube or similar shape that undergoes necking on cold stretching. Not only can the various physical forms of plastic be rendered pearlescent, but also these various plastic objects can be physically cut to any desired size and used as a pearlescent pigment.

The plastic can be cold drawn either uni-axially or bi-axially. The desired effect is to introduce a vacuum gap in the plastic article with the void accomplishing a sufficiently large and abrupt change in the index of refraction to produce pearlescence. The vacuum bubbles are produced in the plastic articles because there has been sufficient plastic strain as to shear the body of the plastic and open up voids within it that are elongated in the direction of the stretch. Of course, care must be taken in second step of bi-axial orientation not to introduce a compressive force which lessens or removes the optical gap. Additionally, it is apparent that the previous uni- or bi-axial orientation history must be such that the plastic is capable of being cold stretched.

Any of the commercially available equipment for drawing plastic articles can be employed in this invention. However, in contrast to conventional plastic orientation which is accomplished above the glass transition temperature of the plastic, the plastics of this invention are cold drawn. The drawing temperature will generally be at least 10° C., preferably 20° C., below the glass transition temperature and is generally in the range of about 15°–50° C., preferably 20°–40° C. Most preferably, the drawing is effected at room temperature or ambient temperature.

In addition to the imparting or enhancing of pearlescence, the opacity of the plastic is also increased. Opacity, or coverage, is a highly desirable characteristic in many applications, and is not obtainable to a high degree when the normal transparent pearlescent platelets are merely added to the plastic. When the nacreous pigment has a color, or where a toner has been added to impart color, the color will still be visible although lessened somewhat by the added opacity.

In addition to imparting pearlescence, the uniaxial cold stretch introduces desirable physical property improvements. Since molecular orientation is more effective at lower temperatures, the cold stretching or room temperature orientation accomplishes more enhancement of the physical properties vis-a-vis conventional hot plastic orientation. Therefore, not only is a higher ultimate tensile strength realized (in the stretching direction—which is the principal physical axis of the plastic article produced) but the Elmendorf tear strength across a plastic film is inordinately high. The converse is true, of course, if a plastic ribbon is so fabricated and an Elmendorf tear strength measurement is made in the long axis of the ribbon—the tear strength is very low. Fortunately, in usage, long ribbons, monofilaments or the like rarely have a tear force extended in the weakened plane.

The following examples are presented in order to further illustrate the invention, but are not intended to limit it. Unless otherwise specified throughout this specification and claims, all temperatures are in degrees centigrade, and all parts and percentages are by weight.

EXAMPLE 1

A section from a bottle wall made of a low density polyethylene (density 0.920; melt index 2.0) and containing 1% wet ground muscovite mica (most platelets 5–40 microns long; surface area 2.5 m.$^2$/g. by the BET method) was cut about 1" in width along the long axis of the bottle. This section was then stretched at room temperature with necking occurring selectively (and not necessarily in sequential position). When the section was pulled to its full necked-down position, it was observed to have a bright, attractive pearlescence. Microscopic study of the section showed that voids had been introduced at the interfaces with the mica platelets. It is assumed that such voids are vacua and the presence of such voids produces the pearlescence.

EXAMPLE 2

Example 1 was repeated except that the low density polyethylene contained 1% of a titanium dioxide coated mica in place of the mica. The bottle wall was pearlescent before stretching and became considerably more pearlescent and opaque after stretching.

EXAMPLE 3

Comparative Experiment

Example 1 was repeated except that the low density polyethylene did not contain any additive. The cold stretching did not result in producing pearlescence.

EXAMPLE 4

The procedure of Example 1 was repeated with a bottle section made of a commercial high density polyethylene (density 0.950; melt index 0.4). When this partially crystalline plastic was cold stretched, pearlescene developed accompanied by observable micro voids.

EXAMPLE 5

The procedure of Example 1 was repeated with a section of a clear (unpigmented) bottle of commercial polypropylene. When this partially crystalline polymer was cold stretched, it became pearlescent and the opacity increased.

EXAMPLES 6–14

The following plastics were tested and it was determined that they could be cold stretched and would neck down on cold stretching:

Example: Plastic
6 ---- High density polyethylene (commercial copolymer).
7 ---- Polypropylene (commercial copolymer).
8 ---- Methyl methacrylate.
9 ---- Polystyrene.
10 ---- Styrene-acrylonitrile copolymer.
11 ---- Polyvinyl chloride.
12 ---- Ethylene-polyvinyl chloride copolymer.
13 ---- Propylene-polyvinyl chloride copolymer.
14 ---- Polycarbonate (Lexan).

Only the polypropylene and high density polyethylene had sufficient crystallinity to produce pearlescence when necked down on cold stretching. Pearlescence was obtained with all of these plastics when the cold stretching was repeated with specimens which had a platy material (mica) incorporated in the plastic.

Unsuccessful attempts were made to introduce pearlescence into already drawn plastic twisted fibers and monofilaments by cold drawing. The reason for the lack of success appears to be that such materials have already been hot worked to practically their ultimate elongation. It is therefore obvious that hot working produces different physical properties from those derived from the cold drawing of the present invention.

Various changes and modifications can be made in the process and products of this invention without departing from the spirit and the scope thereof. The various embodiments disclosed herein serve to further illustrate the invention, but were not intended to limit it.

I claim:

1. A method of imparting or improving pearlescence and increasing opacity which comprises cold drawing a plastic at a temperature at least 10° C. below its glass transition temperature until the desired physical appearance has been achieved, wherein the plastic is a thermoplastic polymer of an unsaturated aliphatic hydrocarbon of 2 to about 10 carbon atoms which necks down upon cold drawing and has crystallinity or contains a platy substance.

2. The method of claim 1 wherein the plastic has crystallinity and is cold drawn at room temperature.

3. The method of claim 2 wherein the plastic additionally contains a platy substance.

4. The method of claim 1 wherein the plastic contains a platy substance and is cold drawn at room temperature.

5. The method of claim 4 wherein the platy substance is mica.

6. The method of claim 4 wherein the platy substance is a nacreous pigment.

7. The method of claim 6 wherein the nacreous pigment is titanium dioxide coated mica.

8. The method of claim 1 wherein the plastic is polyethylene or polypropylene.

References Cited

UNITED STATES PATENTS

| | | | |
|---|---|---|---|
| 3,697,367 | 10/1972 | Schwarz | 161—168 |
| 3,201,506 | 8/1965 | Bills | 264—289 |
| 2,918,696 | 12/1959 | Bottoms et al. | 264—291 |
| 2,968,067 | 1/1961 | Long | 264—289 X |
| 3,325,575 | 6/1967 | Last | 264—289 X |
| 3,513,067 | 5/1970 | Tangorra | 264—108 |
| 3,551,538 | 12/1970 | Yamamoto et al. | 264—175 X |
| 3,644,610 | 2/1972 | Buteux | 264—291 X |
| 3,758,661 | 9/1973 | Yamamoto et al. | 161—164 X |
| 2,863,173 | 12/1958 | Zupic | 264—Dig. 13 |
| 3,679,538 | 10/1970 | Druin et al. | 264—Dig. 13 |
| 3,725,520 | 4/1973 | Suzuki et al. | 264—Dig. 13 |
| 3,765,999 | 10/1973 | Toyoda | 264—291 X |
| 3,783,088 | 1/1974 | Yoshiyasu et al. | 264—291 X |

HAROLD ANSHER, Primary Examiner

U.S. Cl. X.R.

161—6, 164; 264—108, 210 R, 289, 291, Dig. 13, Dig. 17